US007249706B2

(12) United States Patent
Naito

(10) Patent No.: US 7,249,706 B2
(45) Date of Patent: Jul. 31, 2007

(54) INFORMATION COLLECTOR, RESETTING METHOD, PROGRAM AND REMOTE MAINTENANCE SYSTEM

(75) Inventor: Yoshiko Naito, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 288 days.

(21) Appl. No.: 10/854,266

(22) Filed: May 27, 2004

(65) Prior Publication Data

US 2004/0247328 A1 Dec. 9, 2004

(30) Foreign Application Priority Data

Jun. 6, 2003 (JP) ............................ 2003-162156

(51) Int. Cl.
*G06F 17/00* (2006.01)

(52) U.S. Cl. .......................... 235/375; 714/36; 714/44

(58) Field of Classification Search ................ 235/375; 714/36; 399/27; 358/1.14
See application file for complete search history.

(56) References Cited

U.S. PATENT DOCUMENTS 5,084,875 A * 1/1992 Weinberger et al. .......... 714/46
5,787,149 A * 7/1998 Yousefi et al. ........... 455/422.1
5,835,816 A * 11/1998 Sawada et al. ................ 399/8
5,890,029 A * 3/1999 Hirata et al. ................... 399/8
6,112,035 A * 8/2000 Kuroyanagi et al. ........... 399/8
6,119,934 A * 9/2000 Kolls ......................... 235/381

FOREIGN PATENT DOCUMENTS

JP 7-98555 4/1995

* cited by examiner

*Primary Examiner*—Michael G. Lee
*Assistant Examiner*—Allyson N Trail
(74) *Attorney, Agent, or Firm*—Fitzpatrick, Cella, Harper & Scinto

(57) ABSTRACT

To provide a system for transmitting the counter information based on a counter value to be updated and an offset value to be entered in accordance with a communication from a device in order to perform the setting for easily collecting the correct accumulated counted number of prints, in which the counter value is reset when setting the offset value.

9 Claims, 10 Drawing Sheets

| ID | MACHINE NO. | PRODUCT NAME | COMMENT | ALREADY COUNTED NUMBER OF PRINTS | PRINT COUNTING PULSE |
|---|---|---|---|---|---|
| DEV00000 | 005001234567 | GP605 | NEARBY WINDOW AT FOURTH FLOOR | 5123 | 100 |

INFORMATION COLLECTOR, RESETTING METHOD, PROGRAM AND REMOTE MAINTENANCE SYSTEM

BACKGROUND OF THE INVENTION

1. Field of the Invention

The present invention relates to a remote maintenance system for controlling remote devices such as a copying machine, printer and computer.

2. Related Background Art

When an image forming apparatus does not have the capability of accepting a request to obtain an accumulated counted number of prints (sometimes referred to hereinafter as "an accumulated-counted-number-of-prints obtainment request") from a user-side management apparatus, but only the capability of communicating that prints are output one by one as they are printed, the user-side management apparatus accumulates the number of print communication times sent from the image forming apparatus in order to obtain an accumulated counted number. For an example, refer to Japanese Patent Application Laid-Open No. H7-98555. Moreover, the user-side management apparatus manually refers to a counter number of the image forming apparatus before collecting printing counters and holds the value of the counter number. The accumulated counted number of prints of the image forming apparatus is obtained in accordance with the held value and the print communication frequency sent from the image forming apparatus to the user-side management apparatus.

The counted number of prints is important data for charging. When the already counted number of prints is erroneously designated at the time of initial setting by the user-side management apparatus or the counter of the image forming apparatus body does not coincide with the counter held by the information collector for any reason, it is necessary to reset the counted number of prints. To reset the counted number of prints, it is necessary to change or clear the counter value held by the information collector.

SUMMARY OF THE INVENTION

To solve the above problems, an information collector of the present invention comprises:

a transmitting unit for transmitting the counter information according to a counter value to be updated based on the communication from a device and an offset value to be entered; and a resetting unit for resetting the counter value when setting the offset value.

Moreover, a remote maintenance system of the present invention comprises:

an entering unit for accepting the entry of an image forming apparatus to be monitored;

an already-counted-number-of-prints accepting unit for accepting and storing designation of the already counted number of prints of the image forming apparatus entered by the entering unit;

a totalizing-storing unit for totalizing and storing the counted number of prints of the image forming apparatus entered by the entering unit;

a changing unit for clearing the counted number of prints stored by the totalizing-storing unit and changing the already counted number of prints when the already-counted-number-of-prints accepting unit determines that the already counted number of prints is changed; and a communicating unit for totalizing the already counted number of prints accepted by the already-counted-number-of-prints accepting unit and the number of prints totalized by the totalizing-storing unit and communicating the total counted number of prints to a remote monitoring computer.

DESCRIPTION OF THE PREFERRED EMBODIMENTS

Figure 1:
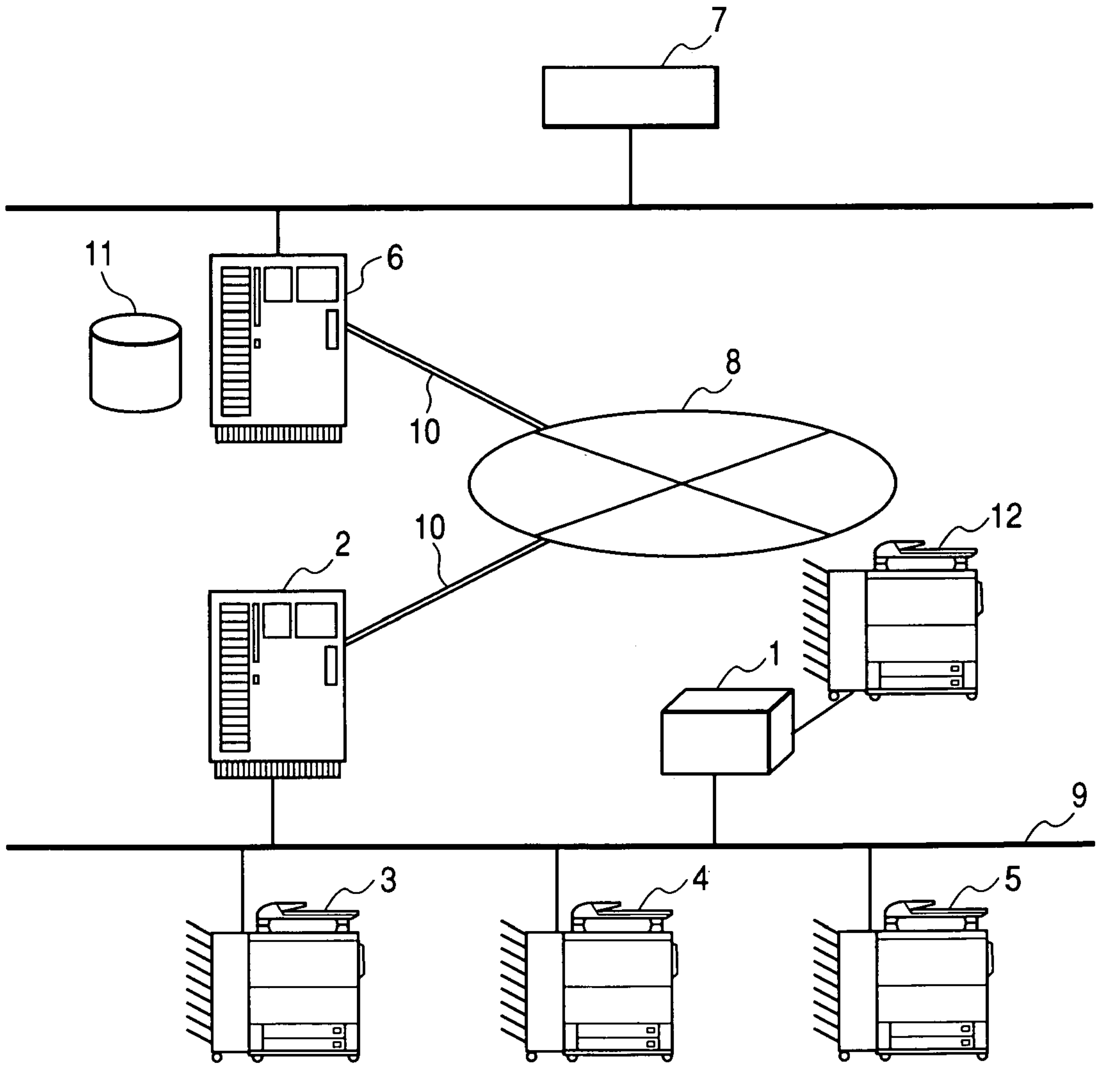
FIG. 1 is a general view of the system of the preferred embodiment of the present invention.

FIG. 1 shows a general view of the system of the preferred embodiment, in which a center-side management server (6) can communicate with a base-side management server (2) in accordance with a predetermined protocol (10) through a communication line (8) such as the Internet.

A server-side management server can communicate with a base-side management server in accordance with a specific protocol (10) through the Internet (8). A general protocol (SMTP) and a certification are also used to prevent unauthorized access and breach of the fire wall.

FIG. 1 shows only one base-side management server. Actually, however, a plurality of base-side management servers can communicate with a center-side management server for unitarily managing the baser-side management servers through a line.

Moreover, reference numerals (3), (4), (5) and (12) in FIG. 1 denote devices. The devices include a printer (including electrophotographic type and ink-jet type) serving as an image forming apparatus, a scanner, a facsimile, a digital complex machine comprehensively provided with printer and facsimile functions, a personal computer and a print server. The image forming apparatus will be described later in detail. An information collector (1) collects information on states of the units (3) to (5), residual toner quantity and printing frequency. Moreover, the information collector (1) connects with the device (12) by a serial I/F to collect the information on the printing frequency and the like.

Figure 2:
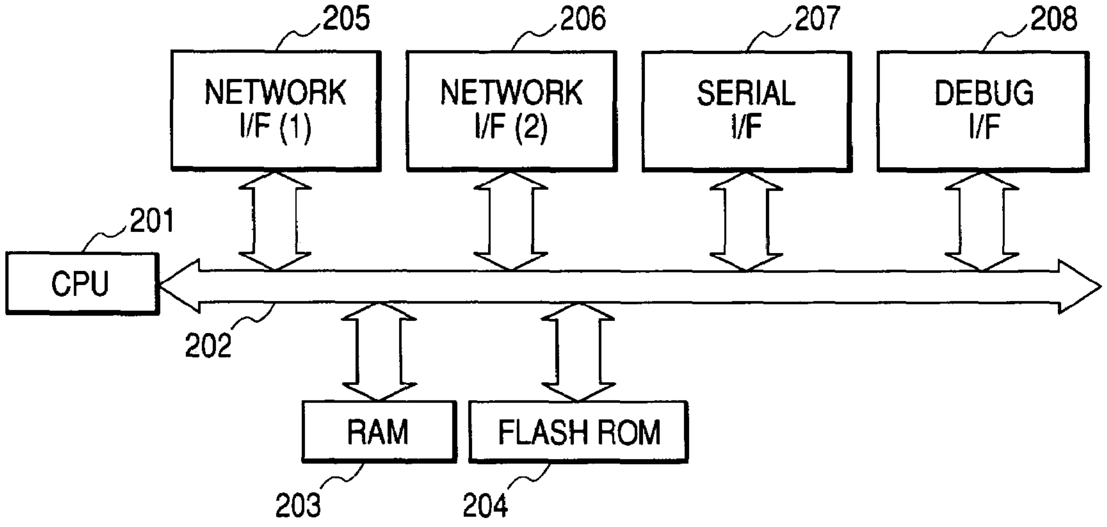
FIG. 2 is a hardware block diagram.

FIG. 2 is a hardware block diagram of the information collector (1) shown in FIG. 1. The information collector (1) in FIG. 1 is constituted by a CPU (201), a bus (202) for delivering data between components to be described later, a RAM (203) in which information can be electrically stored and written, a flash ROM (204) in which information can be electrically rewritten and the information can be stored even if power supply is lost, two network I/Fs (205 and 206) for exchanging information with an external unit via a network, a serial I/F (207) for exchanging information through RS232C serial communication and a serial communication section used for debugging and debug I/F (208).

FIGS. 3A, 3B, 4A and 4B are flowcharts of the information collector (1) shown in FIG. 1.

A case is described below in which information is transmitted to (1) and (2) or (7) in accordance with SMTP and received in accordance with Post-Office Protocol (POP).

Figure 3A:
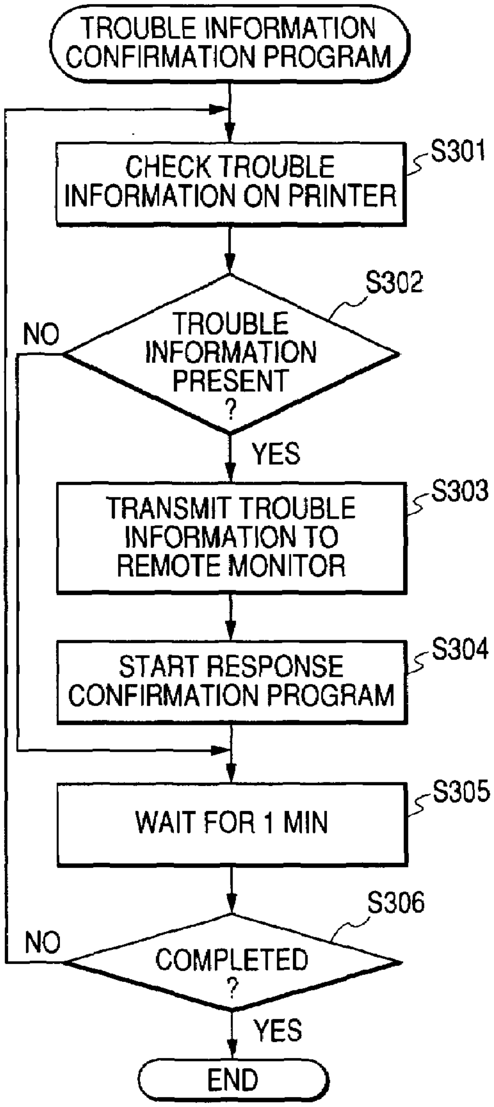
FIGS. 3A and 3B are trouble-information monitoring flowcharts.
Figure 3B:
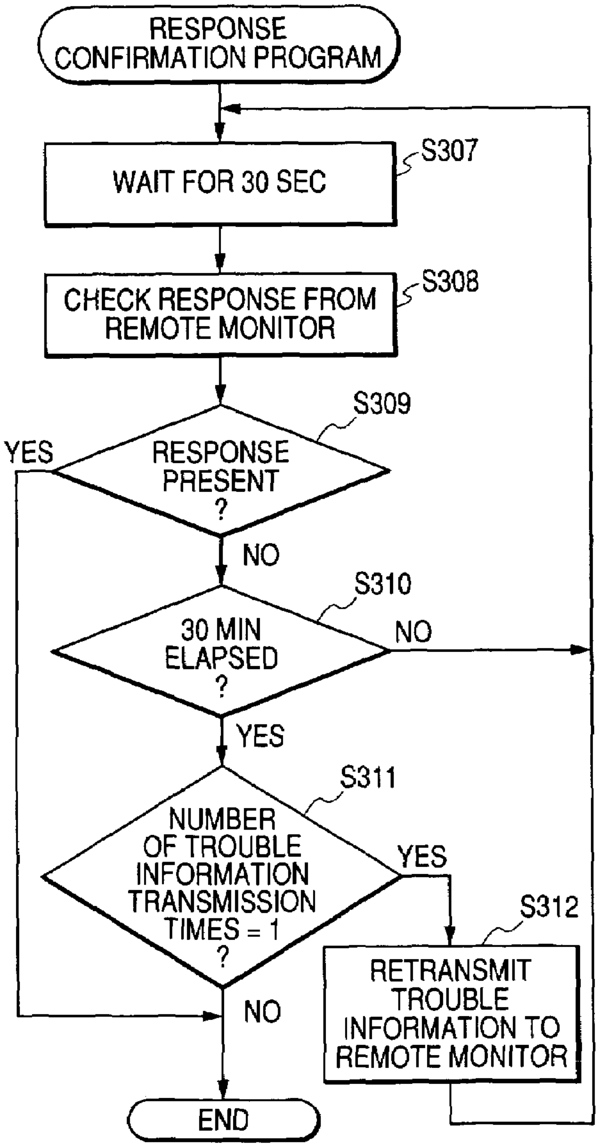

FIGS. 3A and 3B are trouble information monitoring flowcharts of a printer monitor. Trouble monitoring is constituted by a trouble information confirmation program and a response confirmation program.

The trouble information confirmation program is described below by referring to the flowchart in FIG. 3A.

In step S301, trouble information on printers (3) to (5) is obtained in accordance with a specific protocol through a network (9).

When it is determined in step S302 that trouble information can be obtained, the trouble information obtained in step S303 is transmitted to the server (2) or (6).

To confirm that the trouble information is correctly transmitted to the server (2) or (6) in step S304, the response confirmation program in FIG. 3B is started.

In step S305, waiting is continued for a specified time, that is, for 1 minute in the case illustrated in the flowchart.

When it is determined in step S306 that completion is designated to the program, the program is completed. However, in the case other than the above, step S301 is restarted to execute subsequent processing.

When it is determined in step S302 that trouble information cannot be obtained, processing from step S305 downward is executed.

Then, the response confirmation program is performed, as described below by referring to FIG. 3B.

Waiting is continued for a specified time in step S307, that is, for 30 seconds in the case illustrated in the flowchart.

It is checked whether a response is returned from the server (2) or (6) by inquiring of a POP server about it.

When a response is returned in step S310, that is, a response mail is received from the server (2) or (6), the processing is completed.

When it is determined in step S310 that there is no response, processing from the processing in step S311 downward is executed.

When it is determined in step S311 that the maximum time for specified response confirmation is not exceeded, that is, 30 minutes is not exceeded in the case illustrated in the flowchart, processing from the processing in step S307 downward is executed, that is, response checking is continued.

When it is determined in step S310 that the maximum time for response confirmation is exceeded, processing from the processing in step S311 downward is executed.

When it is determined in step S311 that the trouble information transmission frequency is a specified frequency, that is, one time in the case illustrated in the flowchart, the trouble information is retransmitted to the server (2) or (6) in step S312 to execute the processing from step S307 downward.

When it is determined in step S311 that the trouble transmission frequency exceeds the specified frequency, the processing is completed.

Figure 4A:
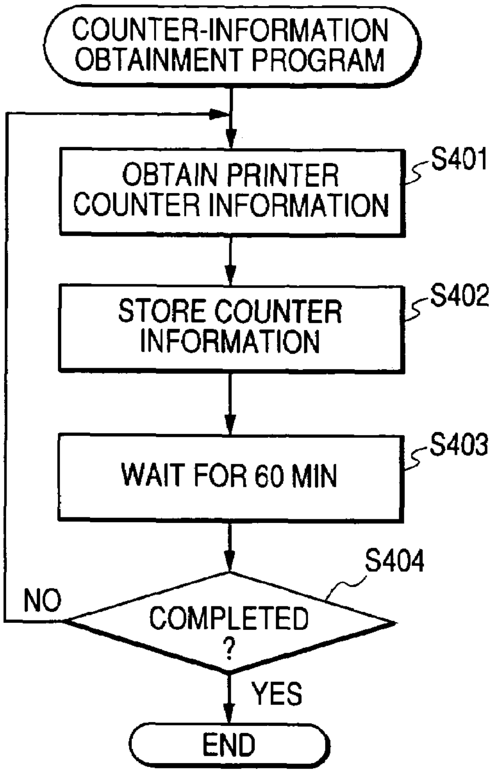
FIGS. 4A and 4B are counter collecting flowcharts.
Figure 4B:
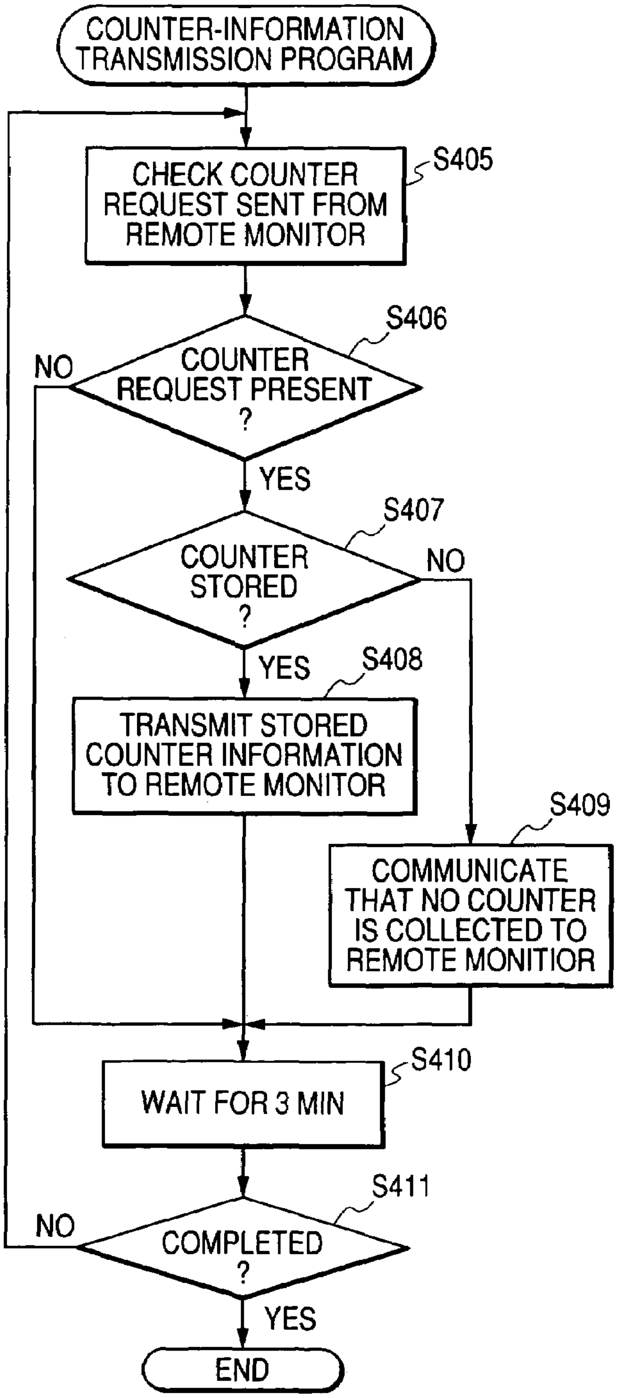

FIGS. 4A and 4B are counter collection flowcharts of a printer monitoring apparatus. The counter collection is constituted by a counter information obtainment program and a counter information transmission program.

The counter information obtainment program is described below by referring to the flowchart in FIG. 4A.

In step S401, counters (number of prints) of the printers (3) to (5) are obtained in accordance with a specific protocol through the network (9).

In step S402, counter information obtained from the printers is stored in a file.

In step S403, waiting is continued for a specified time, that is, for 60 minutes in the case shown in the flowchart.

In step S404, when it is determined that completion is designated to the program, the program is completed, but otherwise, step S401 is restarted to execute subsequent processing.

Now, the counter information transmission program is described by referring to FIG. 4B.

In step S405, an inquiry is made of the POP server as to whether a counter information transmission request mail is present, by the server (2) or (6).

When it is determined in step S406 that a counter request is present, processing from step S407 downward is executed.

When it is determined in step S407 that counter information is stored in the file, the counter information stored in step S408 is transmitted to the server (2) or (6).

When it is determined in step S407 that counter information is not stored in the file, information showing that counter information is uncollected is transmitted to the server (2) or (6) in step S409.

In step S410, waiting is continued for a specified time, that is, for 3 minutes in the case shown in the flowchart.

When it is determined in step S411 that program completion is designated, the program is completed. Otherwise, however, step S405 is restarted to execute subsequent processing.

When it is determined in step S406 that a counter request is not present, processing from step S410 downward is executed.

Figure 5:
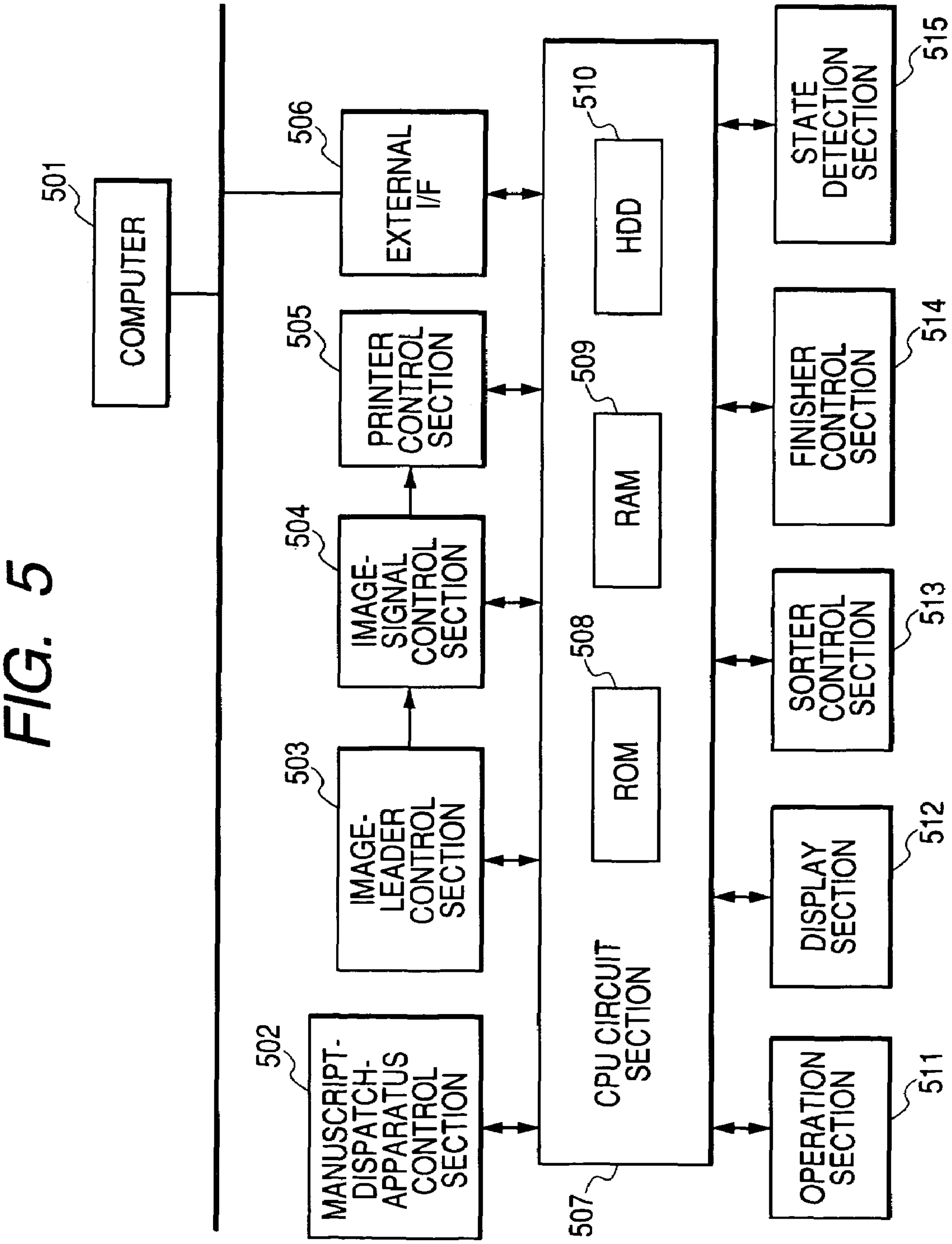
FIG. 5 is a block diagram showing a configuration of a controller for controlling the whole of an image forming apparatus.

FIG. 5 is a block diagram sowing a configuration of a controller for controlling the whole of an image forming apparatus.

As shown in FIG. 5, the controller has a CPU circuit section (507) and the section 507 connects with a CPU (not illustrated), RAM (508), ROM (509) and hard disk (510). A control program stored in the ROM 509 overall controls blocks 502, 503, 504, 505, 506, 511, 512, 513, 514 and 515. The RAM (508) temporarily stores control data and is used as a work area for arithmetic processing. The hard disk 510 stores information necessary for the control program or information received from the blocks 502, 503, 504, 505, 506, 511, 512, 513, 514 and 515.

The manuscript feeder control section 502 driving-controls a manuscript feeder (not illustrated) in accordance with a designation from the CPU 507. The image reader control section (503) driving-controls a scanner unit (not illustrated) and an image sensor (not illustrated) to transfer an analog signal output from the image sensor to the image signal control section (504).

The block 504 converts an analog signal into a digital signal and then applies various processing to the digital signal, converts the digital signal into a video signal and outputs the video signal to the printer control section (505).

The external I/F (506) applies various processing to a digital image signal supplied from a computer (501), converts the digital signal into a video signal and outputs the video signal to the printer control section 505. Moreover, the external I/F 506 communicates with a not-illustrated device management apparatus through a LAN interface. Processing operations by the block 504 are controlled by the CPU 507. The printer control section 505 drives the above exposure control section (not illustrated) in accordance with an input video signal.

The operation section (511) has a plurality of keys for setting various functions relating to image formation and a display section for displaying the information showing set states, outputs a key signal corresponding to each key operation to the CPU 507 and displays corresponding information in accordance with a signal supplied from the CPU 507 on the display section (512).

The sorter control section (513) and finisher control section (514) operate in accordance with a signal supplied from the CPU 507 by an input from a user via the external I/F 506 or setting from the operation section 511. A state detection section collects state information from each section, determines trouble detection and communicates a result to the CPU 507. In accordance with the communication, the CPU 507 displays a trouble on the computer 501 via the display section 512 and the external I/F 506.

Figure 6:
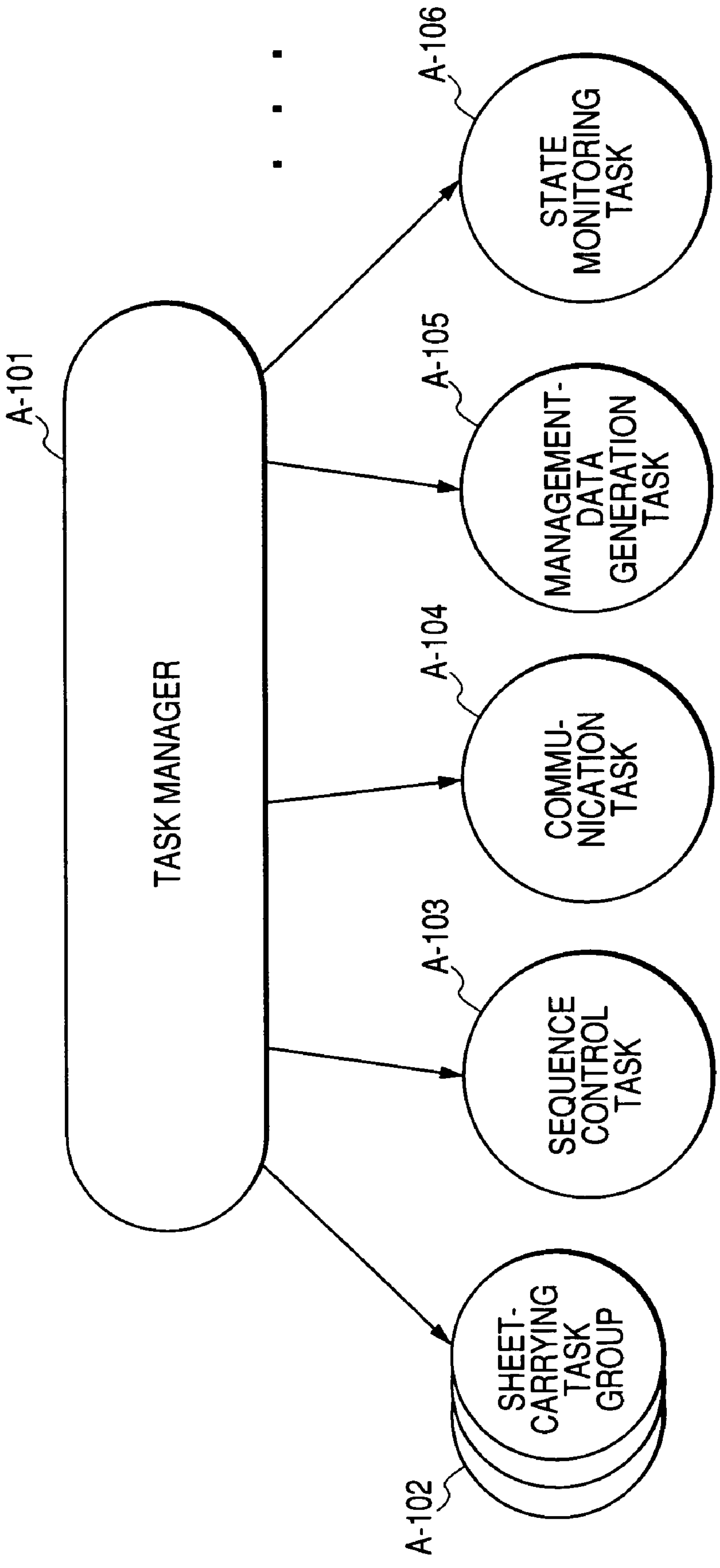
FIG. 6 is a software block diagram of an image forming apparatus.

FIG. 6 shows a software block diagram of an image forming apparatus.

A task manager (A-101) is used to simultaneously manage a plurality of tasks. A sheet-carrying-section task group (A-102) is a task group for carrying a manuscript and a sheet on which an image will be formed. A sequence control task (A-103) is a task for managing the whole of the image forming apparatus. A communication task (A-104) is a task for communicating with a device management apparatus. Moreover, there is a management data generation task (A-105) for generating remote management data for this embodiment.

The image forming apparatus counts each sheet size, each mode, each type of paper and each color whenever forming an image. Counted results of them are performed by a management data generation task (A-105) and stored in the memory of the image forming apparatus.

Similarly, status information on a jam, error and alarm is stored in the memory of the image forming apparatus in accordance with a predetermined data format.

Moreover, the image forming apparatus has a counter (hereafter referred to as a "component counter") showing the replacement service lives and working frequencies of consumable components for each section and results counted in the management data generation task (A-105) are stored in the memory of the image forming apparatus.

When an image-forming-apparatus-state monitoring task (A-106) detects a trouble (jam, error or alarm) in the image forming apparatus or detects a status change of a preset device, a status is stored in the memory of the image forming apparatus in the management data generation task (A-105).

The above described is the basic configuration of the present invention. By referring to FIGS. 7 to 12, a method of the present invention for resetting an already-printed-number-of-prints counter and how to update the counter information collected by the information collector 1 are described below in detail.

Figure 7:
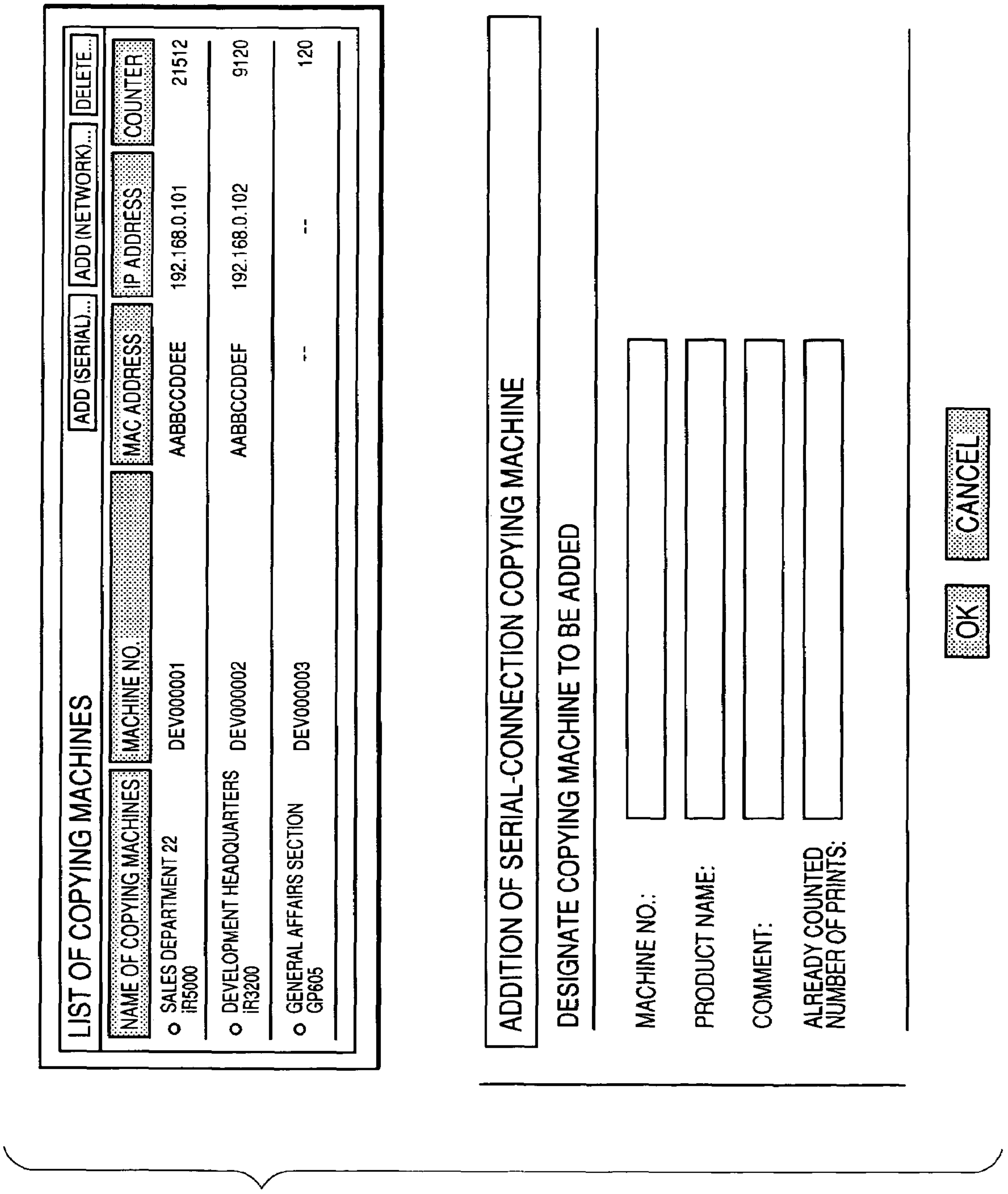
FIG. 7 is an illustration showing an entry designation screen of a monitored image forming apparatus.

FIG. 7 is an illustration showing items entered in the monitored image forming apparatus of the present system. The items include comments for setting information for simplifying management such as device number, product name and setting place for uniquely identifying a device in an information collector and the already counted number of prints of the image forming apparatus 12 to be managed. The already counted number of prints (offset value) is held by the image forming apparatus body, and is read from the image forming apparatus body by a serviceman for entering a monitor and designated by the serviceman.

Figures 8, 9:
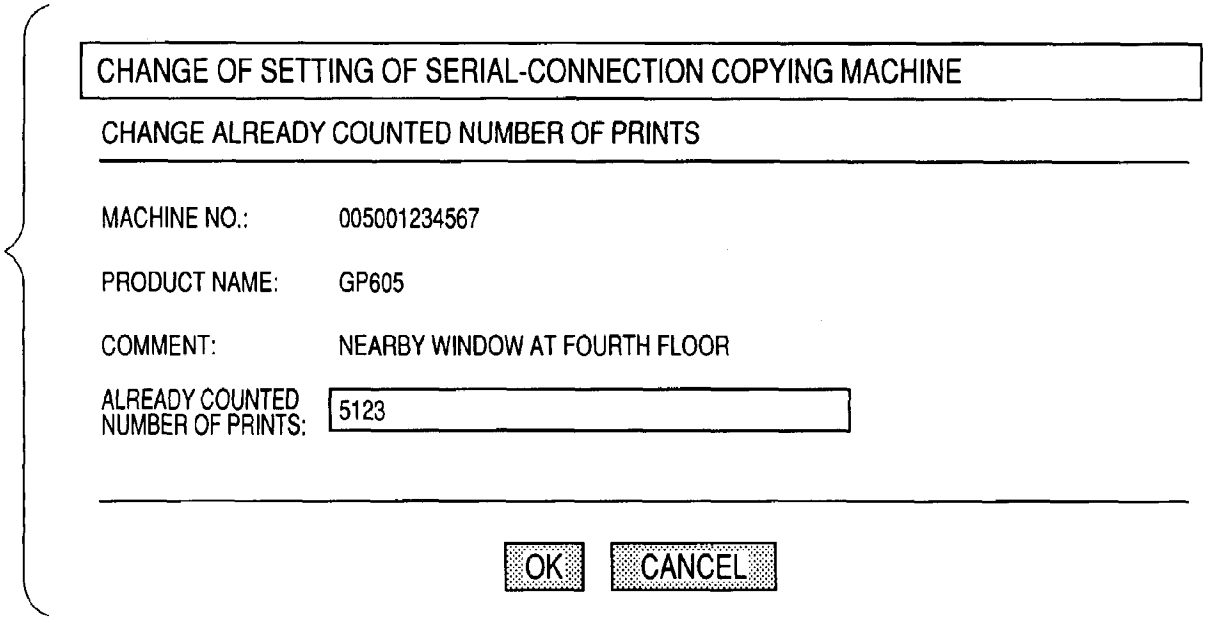
FIG. 8 is an illustration showing a monitored-image-forming-apparatus-information holding format of an information collector.
FIG. 9 is an illustration showing a setting change screen of a monitored image forming apparatus.

FIG. 8 is an illustration showing the held information on the monitored-copying-machine forming apparatus of the present system. The number of print-counting pulses (counter value) communicated to the information collector 1 from the image forming apparatus after entered as an object to be monitored is held in addition to the information designated in FIG. 9. When the image forming apparatus is entered, the number of print-counting pulses is set to 0. The information collector 1 communicates a value obtained by adding the number of print-counting pulses to the already counted number of prints to a remote monitor as the accumulated counted number of prints. The number of print-counting pulses (counter value) is counted up in accordance with a counting pulse signal input from the image forming apparatus whenever the image forming apparatus prints one sheet.

FIG. 9 is an illustration showing a screen for changing the already counted number of prints.

Figure 10:
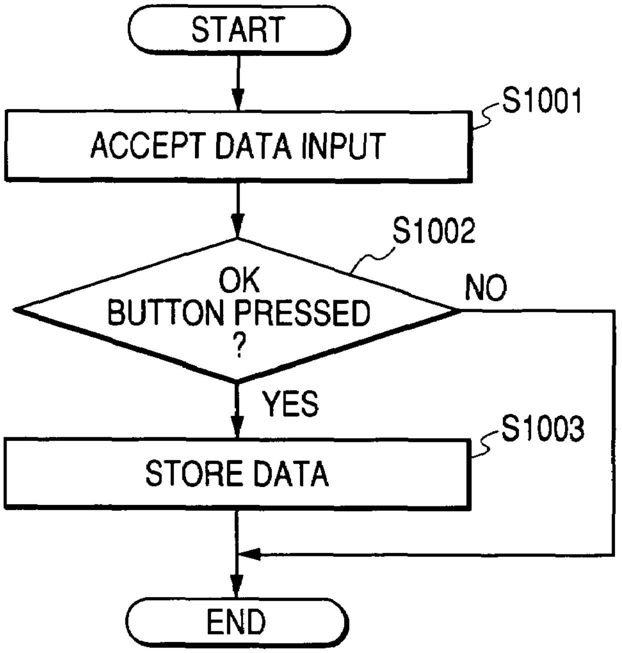
FIG. 10 is a flowchart showing a monitored-image-forming-apparatus entry operation.

The processing for entering the monitored image forming apparatus of the information collector 1 is described below in detail by referring to FIG. 10. A program for the flowchart in FIG. 10 is stored in a memory such as a flash ROM of the information collector 1 and executed by the CPU of the information collector 1.

In step S1001, the data designation screen shown in FIG. 7 is displayed to accept data input.

When it is determined in step S1002 that the OK button is pressed, input data is held in a table having the format shown in FIG. 8, and 0 is set as the number of print-counting pulses.

Figure 11:
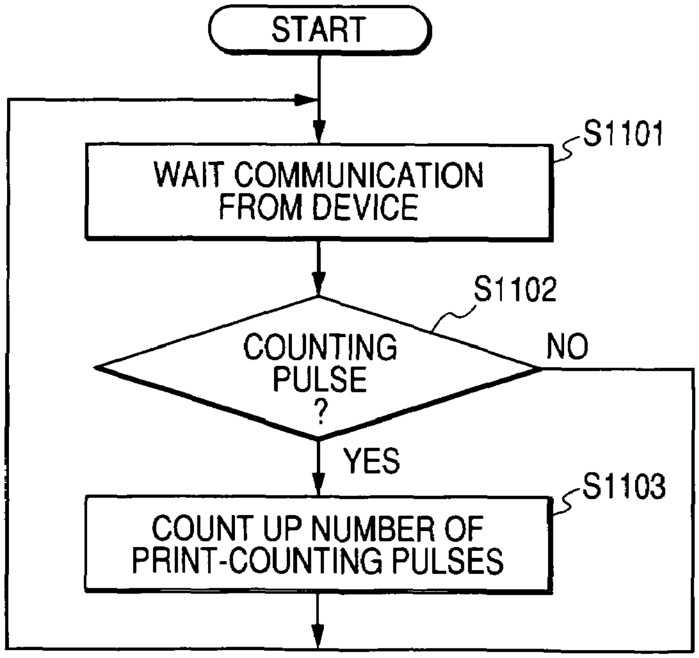
FIG. 11 is a flowchart showing a counted pulse communication operation from a serial-connection image forming apparatus.

The processing for an information collector to collect print counters from devices through a serial I/F is described below by referring to FIG. 1. A program relating for the flowchart in FIG. 11 is stored in a memory such as a flash ROM of the information collector 1 and executed by the CPU of the information collector 1.

In step S1101, communication of data from a device is awaited. When it is determined in step S1102 that the data communicated from the device is a counting pulse denoting that printing is performed, the number of print-counting pulses is counted up in step S1103.

Figure 12:
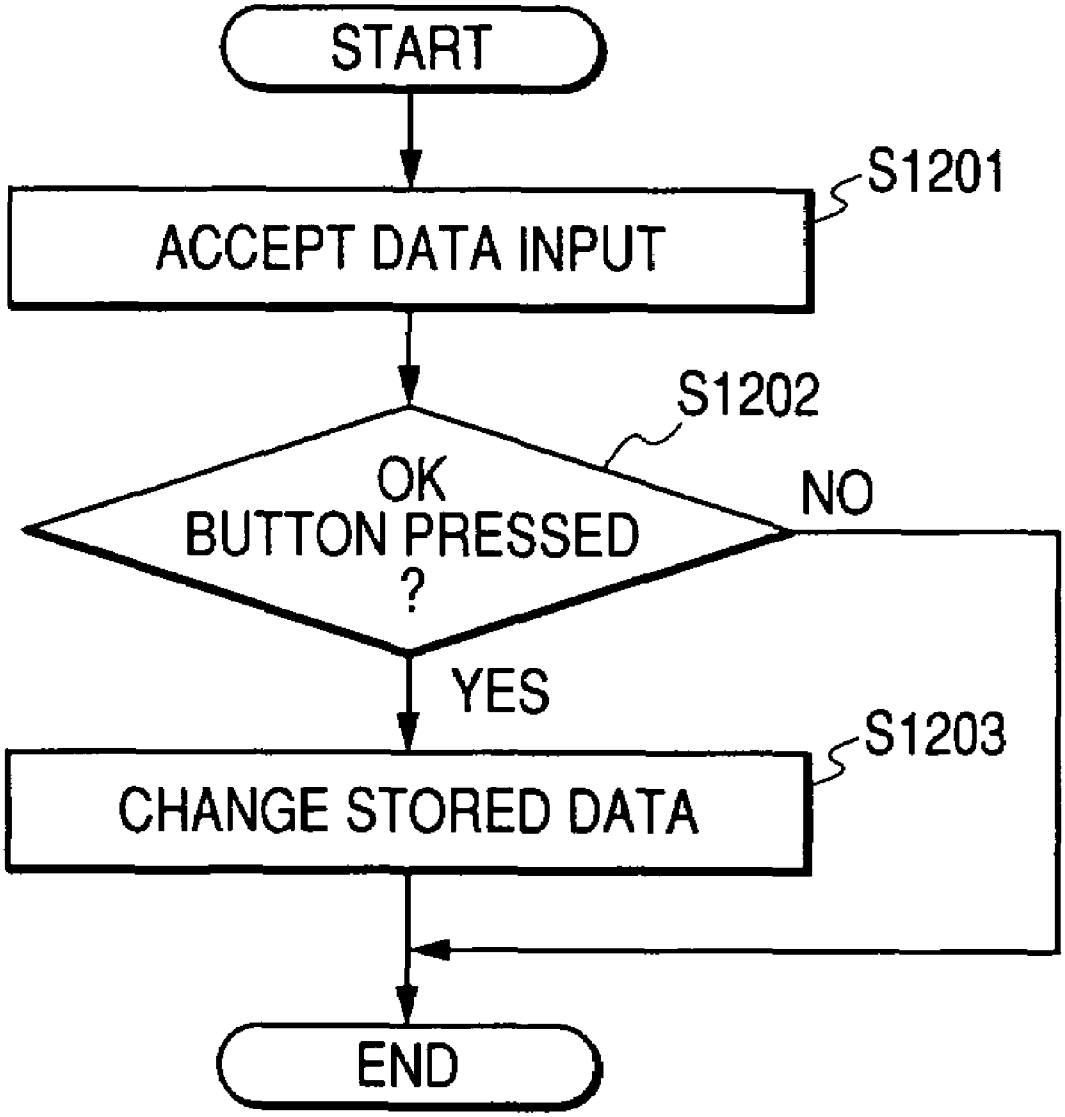
FIG. 12 is a flowchart showing a setting change operation of a monitored image forming apparatus.

The processing for changing the setting of the already counted number of prints is described in detail by referring to FIG. 12. A program for the flowchart in FIG. 12 is stored in a memory such as a flash ROM of the information collector 1 and executed by the CPU of the information collector 1. In step S1201, the screen shown in FIG. 9 is displayed to accept the setting of the already counted number of prints.

When it is determined in step S1202 that the OK button is pressed, the data designated in step S1203 is obtained, the already counted number of prints in the table in FIG. 8 is updated, and 0 is set as the number of print-counting pulses. When the counted number of prints in the image-forming apparatus body to be monitored is correctly designated in step S1201, the total of the already counted number of prints and the number of print-counting pulses coincides with the counted number of prints in the image-forming-apparatus body to be monitored.

As described above, it is easy to perform the setting for collecting the correct accumulated counted number of prints by the embodiment of the present invention.

What is claimed is:

1. An information collector comprising:

transmitting means for transmitting counter information based on (a) a counter value updated in accordance with the communication from a device and (b) an offset value held in a memory to a management apparatus;

input means for inputting the offset value; and resetting means for holding the offset value input by said input means in the memory and for resetting the counter value.

2. The information collector according to claim 1, wherein said transmitting means transmits the counter information in accordance with a request from the management apparatus.

3. The information collector according to claim 1, wherein the communication from the device includes a counting-pulse signal input from the device whenever the device prints one sheet.

4. A resetting method comprising:

a transmitting step for transmitting counter information based on (a) a counter value updated in accordance with the communication from a device and (b) an offset value held in a memory to a management apparatus;

an inputting step for inputting the offset value; and a resetting step for holding the input offset value in the memory and resetting the counter value.

5. The resetting method according to claim 4, wherein said transmitting step includes transmitting the counter information in accordance with a request from the management apparatus.

6. The resetting method according to claim 4, wherein the communication from the device includes a counting-pulse signal input from the device whenever the device prints one sheet.

7. A program stored in a computer-readable storage medium, said program causing a computer to execute a method comprising:

a transmitting step for transmitting counter information based on (a) a counter value updated in accordance with the communication from a device and (b) an offset value held in a memory to a management apparatus;

an inputting step for inputting the offset value; and a resetting step for holding the input offset value in the memory and resetting the counter value.

8. The program according to claim 7, wherein said transmitting step includes transmitting the counter information in accordance with a request from the management apparatus.

9. The program according to claim 7, wherein the communication from the device includes a counting-pulse signal input from the device whenever the device prints one sheet.

* * * * *